No. 11,885. Reissued Jan. 15, 1901.

W. D. SARGENT.

BRAKE SHOE.

(Application filed Nov. 19, 1900.)

Witnesses:
Geo. E. Gaylord,
John Enders Jr.

Inventor:
William D. Sargent
By Paul Synnestvedt Atty.

UNITED STATES PATENT OFFICE.

WILLIAM DURHAM SARGENT, OF CHICAGO, ILLINOIS.

BRAKE-SHOE.

SPECIFICATION forming part of Reissued Letters Patent No. 11,885, dated January 15, 1901.

Original No. 643,734, dated February 20, 1900. Application for reissue filed November 19, 1900. Serial No. 37,000.

*To all whom it may concern:*

Be it known that I, WILLIAM DURHAM SARGENT, a citizen of the United States, residing at Chicago, in the county of Cook and State of Illinois, have invented certain new and useful Improvements in Brake-Shoes, of which the following is a specification.

This invention relates to improvements in brake-shoes, and has for its primary objects to prolong the life of the shoe, to afford a constant and practically-uniform wearing-surface throughout the life of the shoe, and to provide a soft cast-iron shoe with chilled portions so disposed that the transition from the soft to the hardened metal will be gradual and not of a nature to injuriously wear the wheel, as has heretofore uniformly been the case. These and such other objects as may hereinafter appear are obtained by the devices illustrated in the accompanying drawings, in which—

Figure 1:
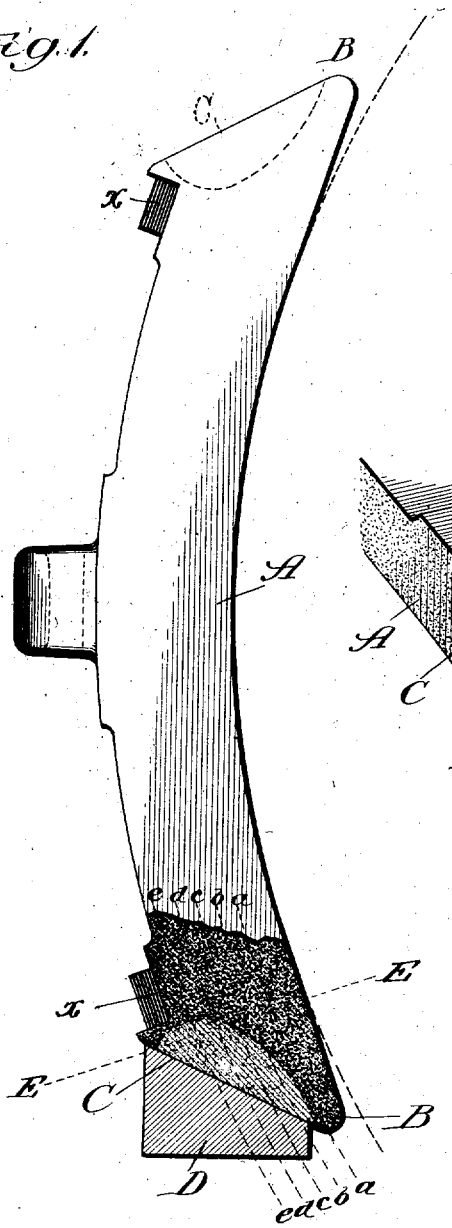
Figure 2:
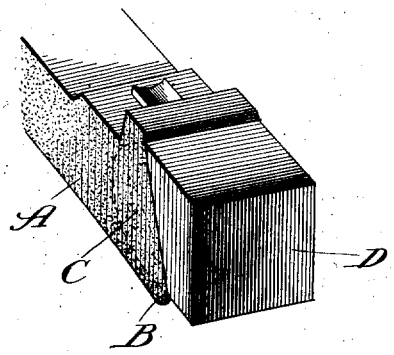

Figure 1 represents a side elevation, partly in section, of brake-shoe embodying my invention. Fig. 2 represents a perspective view of one end thereof, showing the chill applied thereto.

Similar letters of reference indicate the same parts in both figures of the drawings.

Referring by letter to the accompanying drawings, A indicates the body of the brake-shoe; B, prolongations at each end thereof; C, the chilled portions of the prolongations at each end of the shoe, (indicated by dotted lines at the upper end of the shoe,) and D the chill for producing the chilled portions in the prolongations.

The dotted line E and E indicates the line of termination of the body of the brake-shoe as ordinarily constructed, so that the portion B projecting beyond this line at each end of the shoe constitutes a prolongation of the shoe beyond what is ordinarily provided—thus, beyond the outermost points of support where the brake-head bears against the shoe (shown at *x* in Fig. 1)—and affords a means for chilling the ends of the shoe from the back instead of from the front and sides of the shoe. It will be noted that the chill D does not embrace the sides of the shoe nor extend around the wearing-face thereof, but makes contact only with the shoe at the prolongations. While I have shown the prolongation as generally triangular in shape, it may be square, rounding, or of any other desired contour. The chill is set into the mold and the shoe is cast, that portion opposing the chill being hardened from the back inwardly toward the bottom of the shoe, but not extending to the wearing-face thereof, the intention being to leave about three-sixteenths of an inch of soft cast-iron—say from the line *a a* to the wearing-face of the shoe—between the chilled portion and the wearing-face, so that when the shoe is first put in service there will be no contact with the wheel of the chilled portion of the metal until this soft-iron facing is worn down and the wearing-face of the shoe conforms to the arc of the wheel-tread. As will be seen, however, during the wear of the shoe from the point *a a* to the point *b b* the area of chilled metal exposed on the wearing-face of the shoe will be substantially uniform, and this uniformity will continue throughout the life of the shoe, as will be readily seen by an examination of Fig. 1, which shows with approximate correctness the area of the chilled portion at the successive points indicated by the lines *c c*, *d d*, and *e e*.

The chill which is produced by hardening from the back of the end of the shoe is of an entirely different character from that which is produced by hardening the face of the shoe at the end or at any point intermediate to the ends. In the case of my shoe the area of chilled metal at each end of the shoe in contact with the wheel is practically uniform throughout the life of the shoe after the soft-metal facing is worn away, and the chill coming from the back of the shoe, causing the greatest density immediately on the back face of the shoe, with gradually-decreasing density as the chill penetrates the shoe, is not of a nature to injuriously wear the wheel, whereas in the case of shoes having chilled parts made from the wearing-face of the shoe inwardly the area of the chilled section is far greater at the commencement of wear and greatly diminishes as the shoe is worn, while the chill is hardest at the wearing-face of the shoe and of a character calculated to injuriously wear the wheel.

Practically the entire body portion of my shoe coming in contact with the wheel is an area of soft cast-iron, and the area in contact with the wheel at the commencement of service is the same as the Master Car-Builders' standard cast-iron shoe.

My aim is to take a soft cast-iron brake-shoe and add metal at the ends, which may be so hardened from the back as to prolong the life of the shoe without injuriously affecting the wheel or diminishing the frictional power of the shoe. Of course, as before stated, the metal that is added to the end of the shoe may be either shaped as in the drawings or it may be rounded or squared, so long as the essential feature is retained—that of its being chilled or hardened from the back, so that the chill merges into the soft cast-iron before reaching the surface of the shoe exposed to wear against the wheel in commencing service.

While I have shown in the drawings the prolongations as extending tangentially to the tread of the wheel, it is within the contemplation of my invention to form this extension concentric with the tread of the wheel, if desired, though the form shown in the drawings is preferred, because in the commencement of service the area of contact between the shoe and the wheel is the same as the standard cast-iron shoe.

My invention possesses numerous advantages over any prior form of chilled cast-iron shoe known to me, especially as regards the strength of construction, due to the fact that the entire body of the shoe is composed of soft and strong iron and the chilling of the prolongations at the ends does not in any way diminish the strength of the shoe, but rather by increasing the density of the metal inside of and contiguous to the chilled portion adds to the strength of the shoe. Thus it will be easily seen that the prolongations afford a place for chilling the ends without hardening any portion between the outermost points of support, which would weaken the shoe and necessitate something extra to add strength—as, for example, the steel plate commonly used in the back of such shoes as have their wearing-faces provided with chilled portions. It is also to be observed that in shoes constructed in accordance with my invention the hardened part in the back of the ends will resist the common tendency of shoes to wear wedge-shaped—that is, thinner on one end than the other. The above advantages I have demonstrated by tests. Furthermore, I have found that it is possible by chilling from the back to obtain greater uniformity, from the fact that all of the surface of the shoe, as stated above, is of soft cast-iron until the shoe has suffered a wear of about three-sixteenths of an inch, while in all other forms of shoes containing chilled sections there is either a portion of the chilled surface in contact with the wheel at the outset or the area of soft cast-iron in contact with the wheel constitutes only a part of the Master Car-Builders' standard area for shoe-surface. With the characteristics of durability obtained from the chilled portion of my shoe I have greater strength, more friction, and greater uniformity of action on the wheel than any other chilled shoe, and all of these results arise from chilling the back of the prolongation on each end of the shoe.

Having described my invention, what I claim, and desire to secure by Letters Patent, is—

1. A cast-iron brake-shoe having triangular prolongations tapering from the back to the wearing-surface of the shoe at the ends thereof and chill-hardened from the back, said chilled portions not extending to the wearing-surface of the shoe, substantially as and for the purpose described.

2. A cast-iron brake-shoe having tangential triangular prolongations at the ends thereof chill-hardened from the back, said chilled portions not extending to the wearing-face of the shoe, substantially as and for the purpose described.

3. A brake-shoe having prolongations at the ends thereof chill-hardened from the back, substantially as described.

4. A cast-iron brake-shoe having the portion between the outermost points of support of soft iron and provided with prolongations at the ends extending beyond said outermost points of support, said prolongations being chill-hardened from the back, substantially as and for the purpose described.

5. A cast-iron brake-shoe having the portion between the outermost points of support of soft iron and provided with prolongations at the ends extending beyond said outermost points of support, the back of said prolongations being chill-hardened and the wearing-surface thereof soft, substantially as and for the purpose described.

6. A brake-shoe having tangential prolongations at the ends thereof chill-hardened from the back, substantially as described.

WILLIAM DURHAM SARGENT.

Witnesses:
PAUL SYNNESTVEDT,
SAUL CARPENTER.